J. M. COMBS.
ATTACHMENT FOR PLOWS.
APPLICATION FILED MAR. 23, 1914.
1,126,402.
Patented Jan. 26, 1915.
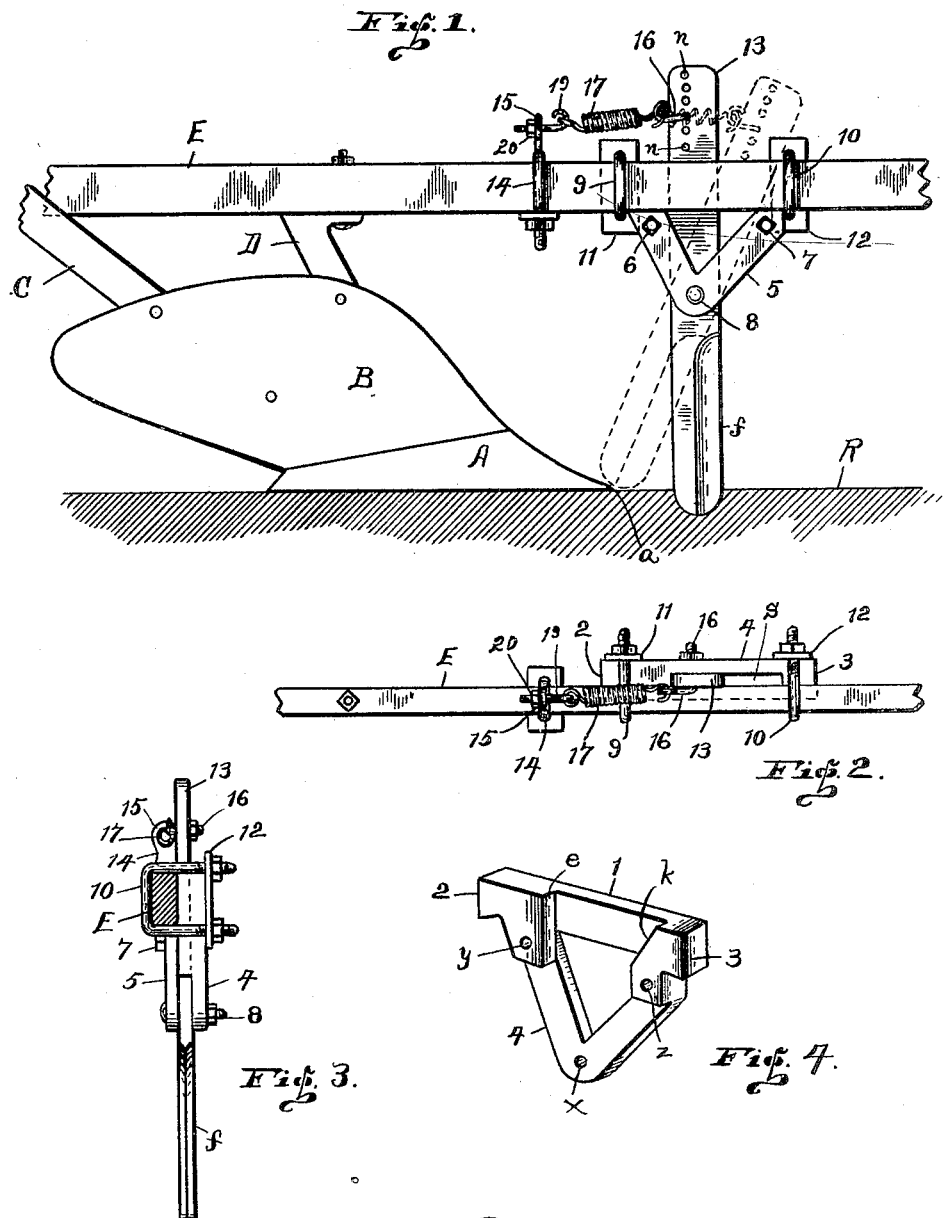

UNITED STATES PATENT OFFICE.

JAMES M. COMBS, OF RICHMOND, INDIANA.

ATTACHMENT FOR PLOWS.

1,126,402.  Specification of Letters Patent.  Patented Jan. 26, 1915.

Application filed March 23, 1914. Serial No. 826,488.

*To all whom it may concern:*

Be it known that I, JAMES M. COMBS, a citizen of the United States, residing in the city of Richmond, in the county of Wayne and State of Indiana, have invented certain new and useful Improvements in Attachments for Plows, of which the following is a full, clear, and accurate specification and exposition, being such as will enable others to make and use the same with exactitude.

The object of my present invention, broadly speaking, is to provide an attachment for plows which will be strong and durable in construction, efficient in practice, easily attached to an ordinary plow, and which can be manufactured and sold at a comparatively low price.

More specifically stated my object is to provide an attachment which is adapted to protect the plow-point, providing a cushion when obstructions, such as roots and stones, are encountered thereby preserving the plow from damage, making it more easy upon the driver and the team and preventing them from receiving sudden jars which might be injurious, and in some instances, when the obstruction is very large or heavy, causing the plow to be lifted from the ground without damage to the plow, the driver, or the team. And another object is to provide an attachment for plows comprising a yieldable cutter adapted to have a limited movement, and having means whereby it is retained in position under tension, which tension is adapted to yield when excessive pressure is encountered, thereby causing the cutter to assume a position different from its normal.

Other objects and particular advantages of my invention will be made apparent in the course of the following description, and by an inspection of the accompanying drawings.

The preferred means for carrying out my invention in a practical manner is shown in the accompanying drawings, in which—

Figure 1 is a front side elevation of a portion of a plow, showing my invention in operative position in connection therewith. Fig. 2 is a top plan view of my invention in connection with a portion of a plow beam. Fig. 3 is a front elevation of my invention. Fig. 4 is a detail perspective view of the body of the invention alone. And Fig. 5 shows the locking wedge.

Similar indices denote like parts throughout the several views.

In order that the construction, the operation, and the advantages of my invention may be better understood and appreciated I will now take up a detailed description thereof in which I will set forth the construction and the operation as fully and as comprehensively as I may.

In the drawings letter A denotes the plow-share, having the point $a$. B denotes the mold-board. C denotes one of the handles. D denotes the standard. And E denotes the beam. All of the said parts being of ordinary construction and they may be variously changed, the same being shown simply to make clear the application of my invention with relation to the said parts.

The body of my invention consists of the construction shown alone in Fig. 4, and it comprises the bar 1, the heads 2 and 3, located on one side thereof, and the V-shaped hanger 4 extending down from the bar and the heads, all substantially as shown. The inner face of the hanger 4 is on the same plane as the inner face of the bar 1, between the heads 2 and 3.

Formed through the lower or vertex portion of the hanger 4 is an aperture $x$, through the head 2 is the aperture $y$, and through the head 3 is the aperture $z$. All of said apertures being formed parallel with each other.

The faces of the heads 2 and 3 are adapted to contact with one side of the beam E, as shown in Fig. 2.

Numeral 5 denotes a V-shaped plate, its upper ends being adapted to contact with the under edge of the beam E, as shown, contacting with the inner faces of the heads 2 and 3, and extending down and conforming to the lower portion of the hanger 4.

Formed through the plate 5 are three apertures, each registering with one of the apertures $x$, $y$ and $z$, with bolts disposed therethrough, as indicated by the bolts 6, 7 and 8. By means of the bolts 6 and 7 the plate 5 is rigidly secured to the heads 2 and 3, while the bolt 8 acts as a journal spanning the space between the plate 5 and the hanger 4.

Numerals 9 and 10 denote the two U-shaped bolts which are adapted to stride the beam E, the former encircling the head 2, and the latter encircling the head 3. Each of the bolts 9 and 10 has a washer-plate, 11 and 12 respectively, through which the two threaded ends of the respective bolts 9 and 10 are disposed with the nuts of the said bolts adapted to tighten the body securely upon the beam, substantially as shown.

By the above it will be seen that a slot $s$ is provided between the beam E and the bar 1, as shown in Fig. 2.

Numeral 13 denotes the cutter, which is in the nature of a flat bar, adapted to fit in the slot $s$, its upper end extending above the beam E, and its lower end, which is rounded, terminating near and in advance of the point $a$ of the share. Near the center of the cutter is an aperture through which passes the bolt 8, whereby the cutter is pivoted, and allowing it to turn, as indicated by the dotted lines in Fig. 1. Below the bolt 8 the forward edge of the cutter is sharpened or brought to an edge, as indicated at $f$ in Figs. 1 and 3. Above the bolt 8 the rear edge of the cutter is adapted to contact with the shoulder $e$ of the head 2, and its forward edge is adapted to contact with the beveled shoulder $k$ of the head 3.

Formed in a vertical row through the upper portion of the cutter 13, above the beam E, are a plurality of apertures $n$.

Secured around the beam E, to the rear of my attachment as above set forth, is the saddle-bolt 14, the same having an eye-piece 15 extending upward therefrom which has an eye formed therethrough.

Numeral 16 denotes a hook-bolt which is adapted to be secured in either of the apertures $n$, as shown, and it terminates in a hook extending back therefrom, substantially as indicated.

Numeral 17 denotes a heavy helical spring having a hook on each end thereof, the forward hook being engaged with the hook of the bolt 16, and the rear hook being engaged in the hook 19, the stem of the latter being slidable in the eye of the eye-piece 15, and with a nut 20 threaded on the rear of the stem of said hook, as shown.

Numeral 18 denotes a wedge or key which is adapted to be inserted in the slot $s$, forward of the cutter 13.

Letter R denotes the ground line on which the plow operates, which may be the bottom of a furrow.

*Modus operandi:* It will now be apparent that if the plow be pulled forward, in the usual manner, the blade $f$ of the cutter 13 will sever the land from the soil being turned over by the plow, while should an obstruction be encountered by the cutter then the impact will be absorbed by the spring and allowing the cutter, in some instances, to assume the position in which it is indicated by dotted lines in Fig. 1. This of course will cause the cutter to be disposed at an angle which will tend to cause the plow to be lifted up over the obstruction. The power of the spring may be varied by changing the bolt 16 from one to another of the apertures $n$, or by changing the saddle bolt 14 to various positions along the beam E, or by turning the nut 20. Also the body of the device may be shifted forward or backward along the beam E and secured in the position desired. In the event that it is desired to make the cutter rigid in its vertical position, then I have only to insert the wedge or key 18 in the slots $s$ forward of the upper portion of the cutter 13.

It is evident that various kinds of springs may be employed in place of the spring 17.

I desire that it be understood that various changes may be made in the shape, the construction, and the location of the several parts with relation to each other and with relation to a plow without departing from the spirit of my invention and without sacrificing any of the advantages of my invention.

Having now fully shown and described the best means for carrying out my invention in a practical manner, what I claim and desire to secure by Letters Patent of the United States, is—

An attachment for plows, comprising in combination with a plow, a body member, means for securing the body member to the plow beam and providing a slot on one side of the plow beam, a plate carried by the body member, a cutter pivoted between the lower portion of said plate and the lower portion of the body member and extending upward through said slot and downward to near the plow point, a spring normally retaining the cutter in vertical position, means for changing the tension of said spring, and means for changing the connection of the spring with relation to the cutter.

In testimony whereof I have hereunto subscribed my name to this specification in the presence of two subscribing witnesses.

JAMES M. COMBS.

Witnesses:
 ROBT. W. RANDLE,
 R. E. RANDLE.

Copies of this patent may be obtained for five cents each, by addressing the "Commissioner of Patents, Washington, D. C."